United States Patent [19]

Paulsen et al.

[11] Patent Number: 5,530,813
[45] Date of Patent: Jun. 25, 1996

[54] FIELD-PROGRAMMABLE ELECTRONIC CROSSBAR SYSTEM AND METHOD FOR USING SAME

[75] Inventors: Mark T. Paulsen, Chanhassen; Steven W. Tonkin, Eden Prairie, both of Minn.

[73] Assignee: Pattern Processing Technology, Eden Prairie, Minn.

[21] Appl. No.: 285,916

[22] Filed: Aug. 4, 1994

[51] Int. Cl.$^6$ ............................................. G06F 13/00
[52] U.S. Cl. ........................ 395/312; 395/280; 395/284
[58] Field of Search .................................. 395/325, 280, 395/284, 312

[56] References Cited

U.S. PATENT DOCUMENTS 4,229,797   10/1980   Ledley ................................... 364/515

OTHER PUBLICATIONS

Copyright page from "Configurable Logic–Design and Application Book—1993–1994" Published 1993. (From Applicant's 1449 form).
Joshua Silver, "High–Performance Scalable Switch Design," Programmable Logic, *ASIC & EDA*, pp. 38–48 (Jun., 1994).
ATMEL Corporation, "Field Programmable Gate Arrays—AT6000 Series," *Configurable Logic—Design and Application Book—1993•1994*, 1993, pp. 3–1–3–36, pp. 7–1–7–18 and 7–45–7–60.

*Primary Examiner*—Jack B. Harvey
*Assistant Examiner*—John Travis
*Attorney, Agent, or Firm*—Schwegman, Lundberg, Woessner & Kluth

[57] ABSTRACT

Method and apparatus for using a field-programmable gate-array circuit as a crossbar switch. In order to connect a first port of the crossbar switch to a second port, an address within the field-programmable gate-array circuit is calculated, and a first data pattern to load at that address is determined. A second data pattern to load at that address is determined in order to disconnect the first port from the second port. The first port is then connected to the second port by loading the first data pattern at the calculated address in the field-programmable gate-array circuit. Subsequently the first port is disconnected from the second port by loading the second data pattern at the calculated address in the field-programmable gate-array circuit. Mechanisms are provided for analog or digital ports, for multiple-bit digital ports, for combinations of logical functions with the crossbar-switch functions, and for latching the data within the crossbar switch. In one embodiment, the crossbar switch is incrementally reconfigurable wherein ports not involved in the reconfiguration are not affected by the reconfiguration operation. Applications to machine vision systems are described.

63 Claims, 9 Drawing Sheets

FIELD-PROGRAMMABLE ELECTRONIC CROSSBAR SYSTEM AND METHOD FOR USING SAME

FIELD OF THE INVENTION

The present invention relates to electronic crossbar-switch systems, and more specifically to electronic systems using field-programmable array circuits for crossbar switches.

BACKGROUND OF THE INVENTION

In an electronic system, there is often a need to dynamically and selectively connect and disconnect subsystem data paths. For example, an electronic vision system typically has many subsystems, such as video cameras, digital memories, and image processors, which must be connected to one another in various configurations. One interconnection scheme connects several subsystems to a single common bus. This scheme has the drawback that the common bus becomes a performance bottleneck, allowing only one data transfer to occur at a time.

For performance reasons, it is desirable for the interconnection scheme to enable several high-speed connections to be simultaneously transferring data between any of a plurality of source ports and any of a plurality of destination ports. It is also desirable to allow the starting times and ending times of the various transfers to occur asynchronously, and to allow some of the connections to transfer or clock data at different rates than other connections. One scheme which tries to address these concerns uses an N-way multiplexer (mux) at each subsystem, with separate busses feeding each multiplexer from every other subsystem. This scheme, however, quickly becomes unmanageably complex and tangled as the number of subsystems to be connected increases.

An electronic system to dynamically interconnect subsystems might use a network of wires and electronically activated switches, controlled by a system controller, to connect one subsystem to another as the need arises, and later to remove the connection when the need has ended. One such system is the "plain old telephone system" which uses an electronic "crossbar" switch system to connect one subscriber to another when a phone call is made, and later to remove the connection when the subscribers hang up.

One combination of the above-mentioned concepts might implement an electronic vision interconnection system using an electronic crossbar system. Some researchers have examined alternative solutions to the problem of obtaining the equivalent of a full N-input by N-Output crossbar switch. If implemented with multiplexers, each input must fanout to all N multiplexers (with the high associated capacitive load slowing the connection process). $Log_2N$ control lines are needed for each multiplexer. The high number of interconnection nets and the resulting congestion make all but the simplest routing infeasible. As an alternative, some researchers have suggested banyon networks, Beneš networks, or combinations of banyon and Beneš networks (see, e.g., Joshua Silver, High-Performance Scalable Switch Design, page 38–48 ASIC & EDA, (June 1994)). Such networks might work well for some applications, but it can be difficult to reprogram such networks on-the-fly, particularly where it is desired to remove single connections and create others, while leaving the majority of connections as they were.

An electronic crossbar system also can be implemented using application-specific integrated circuits (ASICs), but this approach is impractical in certain cases due to high costs (particularly at low volumes) and long turn-around times from initial conception to delivery of a final product to market.

What is needed is a high-performance crossbar interconnection system which can be implemented simply, quickly and inexpensively, even in low volumes. The system also needs to (a) allow high-speed data transfers on multiple paths simultaneously, (b) allow fast incremental addition and removal of interconnections, and (c) insert minimal delay in the interconnection path.

SUMMARY OF THE INVENTION

One embodiment of the present invention addresses these needs by providing a method and apparatus for connecting components in an electronic vision system, by providing a field-programmable gate-array (FPGA) circuit having a plurality of ports, providing a plurality of electronic vision subsystems, coupling each of the plurality of electronic vision subsystems to a respective FPGA port from among the plurality of FPGA ports, and programming the FPGA circuit to create a plurality of connections among the plurality of electronic vision subsystems so that:

(a) at least two of the plurality of connections exist simultaneously, (b) a starting time of one of the connections is not substantially simultaneous with starting times of other connections, and (c) an ending time of that one connection is not substantially simultaneous with ending times of other connections.

Another embodiment of the present invention addresses these needs by providing a method and apparatus for crossbar switching by providing a field-programmable gate-array (FPGA) circuit having a plurality of ports, and programming the FPGA circuit to create a plurality of connections among the plurality of ports such that:

(a) at least two of the plurality of connections exist simultaneously;

(b) a starting time of one of the simultaneously existing connections is substantially not simultaneous with starting times of other connections; and (c) an ending time of the one connection is substantially not simultaneous with ending times of other connections.

Yet another embodiment of the present invention addresses these needs by providing a method and apparatus for using a field-programmable gate-array (FPGA) circuit as a crossbar switch. The crossbar switch has a plurality of first ports and a plurality of second ports. In order to connect a first port of the crossbar switch to a second port, an address within the field-programmable gate-array circuit is calculated, and a first data pattern to load at that address is determined. A second data pattern to load at that address is determined in order to later disconnect the first port from the second port. The first port is connected to the second port by loading the first data pattern at the calculated address in the field-programmable gate-array circuit. Subsequently the first port is disconnected from the second port by loading the second data pattern at the calculated address in the field-programmable gate-array circuit.

Yet another embodiment of the present invention addresses these needs by providing a crossbar switch comprising a field-programmable gate-array (FPGA) circuit having a plurality of ports which can be programmably connected to each other, and a system controller connected to the FPGA circuit for programming the FPGA circuit to:

(a) at a first point in time, connect a first port chosen from the plurality ports to a second port chosen from the plurality of ports, (b) at a second point in time subsequent to the first point in time, connect a third port chosen from the plurality of ports to a fourth port chosen from the plurality of ports, (c) at a third point in time subsequent to the second point in time, disconnect the first port from the second port, and (d) at a fourth point in time subsequent to the second point in time, disconnect the third port from the fourth port.

In yet another embodiment, a connection between a first port and a second port is a digital connection comprising digital circuitry.

In yet another embodiment, a digital connection connects a plurality of parallel bits.

In yet another embodiment, the crossbar switching is used to programmably connect components in an electronic vision system.

In yet another embodiment, data passing through a digital connection are latched in flip-flops on said FPGA.

In yet another embodiment, a digital logical function is performed on data passing through a digital connection.

In yet another embodiment, an FPGA crossbar connection is an analog connection comprising analog circuitry.

In yet another embodiment, crossbar switching is used to programmably connect components in an electronic vision system.

In yet another embodiment, an input port accepts an analog signal, an output port drives a digital signal, and a connection between the input port and the output port comprises a circuit to convert an analog signal into a corresponding digital signal.

In yet another embodiment, crossbar switching is used to programmably connect components in an electronic vision system.

In yet again another embodiment, the FPGA is incrementally reconfigurable.

Some of the advantages to be had from the present invention are that it can be implemented using inexpensive integrated circuits which are available and fully tested "off-the-shelf"; large, non-recurring design costs are avoided; the routing of wiring is made very much simpler than other approaches which try to interconnect a similar number of ports; the system can be designed to use less power than other approaches; a logical function can be added by a software update without requiring a hardware change; fewer pins are used for control lines to the crossbar circuits; and the system is incrementally reconfigurable during operation.

DESCRIPTION OF THE PREFERRED EMBODIMENTS

Figure 1:
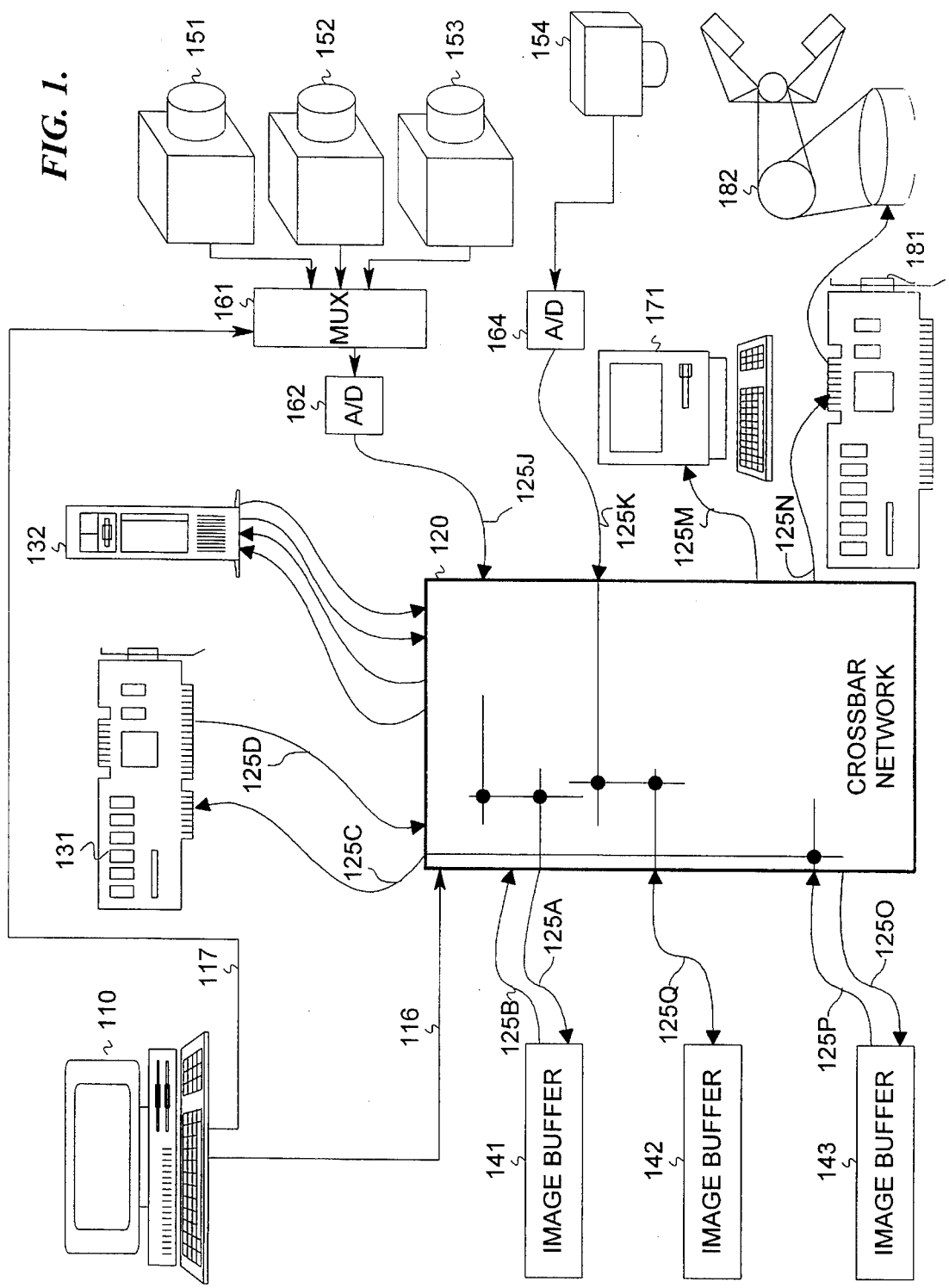
FIG. 1 is a schematic diagram illustrating an embodiment of the present invention showing an electronic vision system including a crossbar-switch network 120.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The term "electronic vision" as used in this disclosure should be interpreted broadly to include all manner of imaging systems such as electronic vision systems, machine vision systems, scanning systems, radar mapping systems, etc., which are used in systems for such purposes as quality control, robotics control, measurement systems, avionics, military imaging and fire-control systems, manufacturing assembly verification machines, optical character recognition and optical character verification systems, and process control systems.

The term "crossbar switching" should be interpreted to mean a process wherein a plurality of simultaneous connections among the various subsystems of an electronic system may be created and wherein the starting time of any one connection is substantially asynchronous to the starting times of any other connection, and the ending time of that one connection is also substantially asynchronous to the ending times of any other connection, and wherein a given subsystem may be selectively and/or successively connected to any one of a plurality of other subsystems in the system.

In the plain old telephone system example referred to above in the Background section, the initiating subscriber specifies a connection to be made by dialing the phone number of the destination subscriber. In an electronic vision system, a system controller controls the making or breaking connections. The term "system controller" should be interpreted to comprise hardware or software or both. Such hardware includes, but is not limited to, microcontrollers, logic sequencers, programmable logic devices, microcomputers, or computers. Such software includes, but is not limited to, system control programs, microcode, digital bit patterns, bit streams, or byte streams.

The FPGA circuits can be programmed. The term "programmed" should be interpreted to mean any process which configures the FPGA to perform in a particular way, including but not limited to applying a bit pattern to one or more pins on the FPGA.

The term "incrementally programmable" should be interpreted to mean any process which reconfigures one section of an FPGA circuit while other sections are not reconfigured, and are left operating and undisturbed by the incremental programming operation.

Electronic vision systems are comprised of "electronic vision subsystems" or "components", phrases which should be interpreted to include, but not be limited to, video cameras, image buffers, image processors, image displays, charge-coupled devices (CCDs), image scanners, A/D converters, crossbar switches, and robot controllers.

FIG. 1 is a schematic diagram illustrating one embodiment of the present invention as used in an electronic vision system. Crossbar network 120 programmably connects and disconnects various subsystem components to and from one another under the control of system controller 110 via control bus 116. For instance, the signal from video camera 151, 152, or 153 is selected by video multiplexer 161, and converted from an analog video signal into a digital data stream by analog-to-digital (A/D) converter 162. System controller 110 drives signals onto control lines 117 to direct the signal routing in video analog mux 161. In one embodiment, A/D converter 162 produces a parallel digital signal comprising successive 8-bit parallel digital representations of the analog video signal from video multiplexer 161. This parallel digital signal is coupled to port 125J on crossbar network 120. "Ports" to crossbar network 120 are the interface by which data signals from subsystem components in the system may couple to crossbar network 120.

Image input components 151 through 154 may include any suitable image input device such as video cameras, CCD devices, or image scanners. In one embodiment, video camera 154 is connected directly to A/D converter 164 whose output is wired or coupled to port 125K on crossbar network 120.

In one embodiment, ports 125A and 125B on crossbar network 120 are wired to image buffer 141. In this embodiment, image buffer 141 has separate inputs and outputs, with the inputs connected to port 125A and the outputs connected to port 125B on crossbar network 120.

Port 125Q on crossbar network 120 is wired to image buffer 142. In one embodiment, image buffer 142 has a common bus for inputs and outputs, with this common bi-directional bus connected to port 125Q on crossbar network 120. Port 125Q is programmed to be either an input port or an output port, depending on the direction of the data to be transmitted through it.

At a point in time, system controller 110 might program the connection of the parallel digital signal from port 125J to port 125A, in order to store the digital representation of one or more video frames from, for instance, video camera 151 into image buffer 141. At that same point in time, system controller 110 might program the connection of the parallel digital signal from port 125K to port 125Q, in order to simultaneously store the digital representation of one or more video frames from video camera 154 into image buffer 142. Also at that same point in time, system controller 110 might program the connection of the parallel digital signal from port 125P to port 125C, in order to simultaneously load image processor 131 with an image previously stored in image buffer 143.

At a later point in time, system controller 110 might program the breaking of the connection from port 125J to 125A, and instead connect port 125J to port 125O, in order to store the digital representation of one or more video flames from, for instance, video camera 152 into image buffer 143. At that same later point in time, system controller 110 might program the connection port 125D to port 125M, in order to simultaneously display a previously processed image from image processor 131 onto display device 171. Display device 171 may be any suitable image output device such as a cathode-ray tube (CRT) display, video-to-film converter, image-to-Writable-Optical-Disk converter, or video recorder.

In another embodiment, the data from image-processor 131 are fed through crossbar network 120 to robot controller 181, which further processes the data and then controls robot arm 182 in order to control, for example, a manufacturing process which is being "watched" by video camera 154.

As can be seen from the discussion above, a multitude of high-speed data transfers can be programmed and arranged to occur simultaneously through the crossbar switch—something that is not possible across a single common bus structure. The system shown in FIG. 1 also allows maximum utilization of expensive subsystem components such as image buffers and image processors. In order to maximize performance, it is also important to be able to reconfigure crossbar network 120 as quickly as possible, and to make or break single connections without disturbing data transfers which may be in progress on other connections within crossbar network 120.

In one embodiment, crossbar network 120 is implemented using AT6002 FPGA circuits from Atmel Corporation of 2125 O'Nel Drive, San Jose, Calif. 95131. The AT6002 FPGA part is described in the "Configurable Logic Design and Application Book 1993–1994" published and available from Atmel Corporation, which is hereby incorporated by reference. Additional details on programming particular Atmel FPGA parts are available from Atmel upon request, such as "A Guide to the Configuration of an AT6005 and the Bit Stream File", which can be used to derive addresses and bit-stream values for particular parts, and are hereby incorporated by reference. The AT6002 FPGA has 1024 internal cells arranged in a 32 by 32 array, and has up to 96 input/output (I/O) cell terminals. The I/Os of the Atmel AT6002 FPGA are divided into four groups: North, South, East, and West. The AT6002 can be either completely reprogrammed or reconfigured, or partially reprogrammed—even down to a cell-by-cell and bus-segment-by-bus-segment reprogram mode. These latter capabilities of the AT6002 provide a particularly useful feature for implementing the present invention: the ability to very quickly modify one connection or a very few connections, while all the rest of the connections on the chip remain as they were.

In one embodiment, AT6002 parts in 100-pin TQFPs (a square flat-pack for surface mounting) are used, using 15 "A"-type I/O cells on each of the four edges of each chip, for a total of 60 I/O pins per chip circuit. In this embodiment, two bits of each port of crossbar network 120 are implemented on each chip, and four chips are used. The resulting crossbar network 120 has a total of 30 ports which can be configured as any combination of up to 30 input ports and output ports, each of which is 8 bits wide.

In another embodiment, crossbar network 120 is implemented using FPGA circuits, such as part number XC3042 from Xilinx Corporation of 2100 Logic Drive, San Jose, Calif. 95124. This Xilinx FPGA part needs to be completely reprogrammed in order to change the connection configuration.

Figure 2:
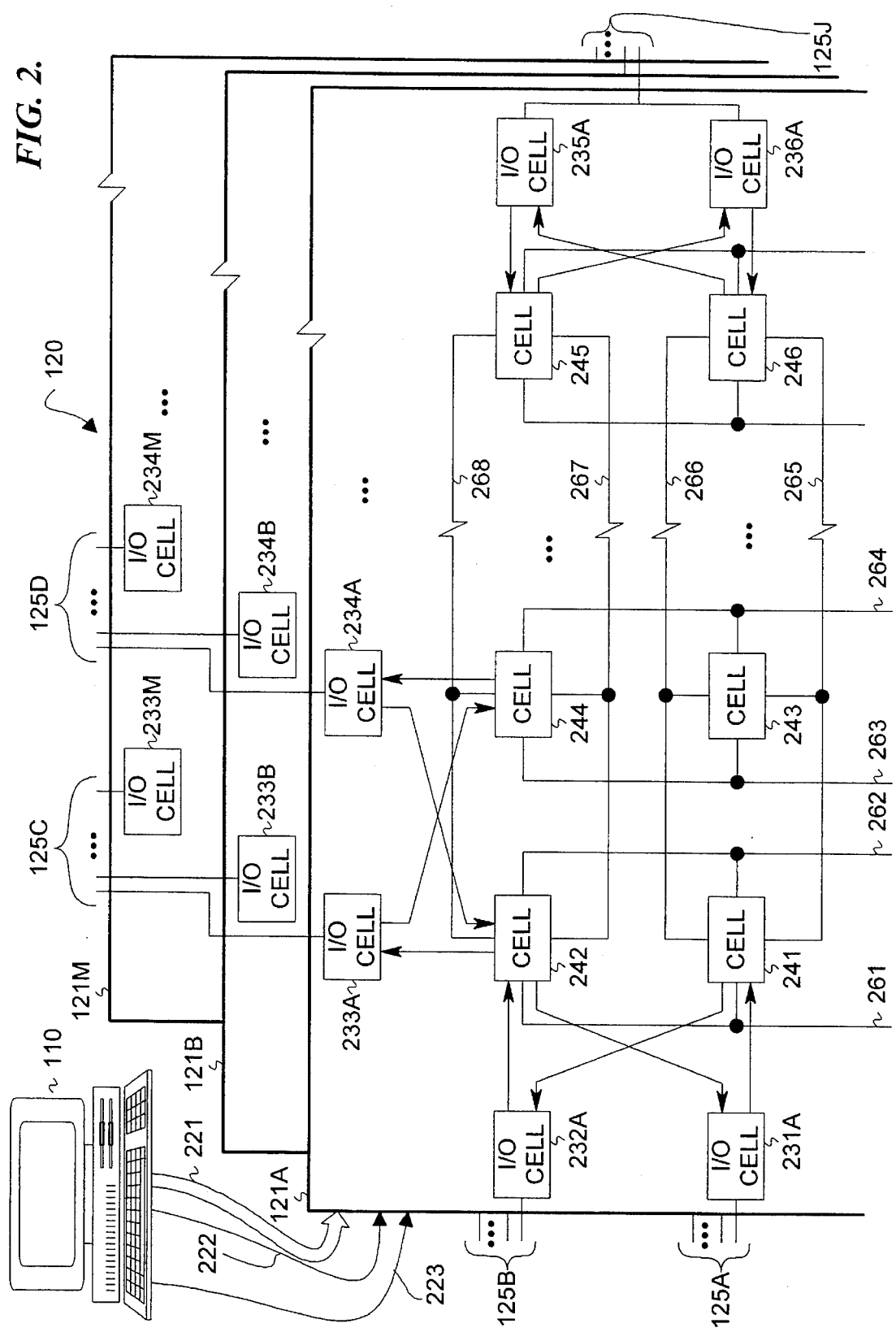
FIG. 2 is a schematic diagram illustrating portions of a set of field-programmable gate-array circuits used as crossbar-switch network 120 of FIG. 1, showing an embodiment including digital ports to the crossbar network.

FIG. 2 is a simplified schematic diagram illustrating a portion of a set of field-programmable gate-array circuits used as crossbar-switch network 120 of FIG. 1 in an embodiment comprising digital ports coupled to the crossbar network.

A "digital port" is an input port which accepts digital signals (i.e., signals having discrete values, such as, but not limited to, a binary signal), or an output port which drives a digital signal. A "digital connection" between a digital input port and a digital output port typically comprises digital circuitry such as digital drivers, digital latches, and digital logic gates. An "analog port" is an input port which accepts analog signals (i.e., signals having continuous values, such as, but not limited to, a video signal), or an output port which drives an analog signal. An "analog connection" between an analog input port and an analog output port typically comprises analog circuitry such as operational amplifiers, sample-and-hold circuits, and analog frequency filters. An "analog-to-digital connection" between an analog input port and a digital output port typically comprises analog-to-digital conversion circuitry.

FPGA circuits 121A through 121M are used to implement the M-bit-wide ports of crossbar network 120. In one embodiment, FPGA circuits 121A through 121M are programmed in parallel (such that each bit of an M-bit-wide port is connected or disconnected at the same time as all the other bits of that port) using signals from control/address/data bus 221 under the control of configure signal 222 and clock 223. Programming is typically accomplished by loading static random-access memory (SRAM) locations (not shown) which control the logical operation and connections of the internal busses and cells on the FPGA circuits.

Conventional FPGA circuits have no way of loading only specified SRAM locations, and thus the entire FPGA SRAM must be reloaded every time the connection topology is to be changed. Other circuits, such as the AT6002 FPGA from Atmel Corporation, allow specified SRAM locations to be reprogrammed without changing any other locations already programmed.

In one embodiment, input/output (I/O) cell 234A on FPGA circuit 121A (and the corresponding I/O cells 234B through 234M on FPGA circuits 121B through 121M, respectively) form the I/O interface for port 125D. Similarly, I/O cells 233A through 233M form the I/O interface for port 125C, I/O cell 232A and the corresponding I/O cells on FPGA circuits 121B through 121M form the I/O interface for port 125B, and I/O cell 231A and the corresponding I/O cells on FPGA circuits 121B through 121M form the I/O interface for port 125A.

The array of internal cells are typically connected to the I/O cells at the edges of the array, and to each other by either direct connection to adjacent cells, or by connection to local busses which run orthogonally across the chip. Each of these connections is typically programmable; that is, a particular data-bit pattern stored in a particular SRAM location on the chip controls the logic function of a cell and the connections to be made to various adjacent cells or local busses. In one embodiment, each row of cells is programmably connectable to upper and lower "East-West" local busses and to left and right "North-South" local busses. For example, internal cell 243 on FIG. 2 is programmably connectable to East-West local bus 266, to East-West local bus 265, to North-South local bus 263 and/or to North-South local bus 264.

The programming of the FPGA allows any particular cell to be disconnected from a particular local bus, to receive data from the local bus, or to drive data onto the local bus.

In operation, system controller 110 controls the operation of crossbar network 120. For example, at a point in time, system controller 110 might program the connection of the parallel digital signal from port 125J to port 125A. To do so, system controller 110 calculates the appropriate addresses and data patterns to load into FPGA circuits 121A through 121M, and drives the corresponding signal patterns onto control/address/data bus 221, configure signal 222, and clock 223. As a result, I/O cell 235A on FPGA circuit 121A is programmed as an input to internal cell 245. Internal cell 245 is programmed to connect the signal from I/O cell 235A onto local bus 267 which routes the signal to internal cell 242. Internal cell 242 is programmed to connect the signal to I/O cell 231A which is programmed as an output to port 125A. The corresponding I/O cells and internal cells of FPGA circuits 121B through 121M are programmed in parallel with FPGA circuit 121A, thus effecting the connection of the other parallel bits of port 125J to 125A.

At a later point in time, system controller 110 might program the disconnection of the parallel digital signal from port 125J to port 125A, and the connection of port 125B to port 125C. System controller 110 again calculates the appropriate addresses and data patterns to load into FPGA circuits 121A through 121M, and drives the corresponding signal patterns onto control/address/data bus 221, configure signal 222, and clock 223. As a result, I/O cell 235A on FPGA circuit 12 1A is programmed to turn off (disconnect from all its interfaces); similarly, internal cells 242 and 245, and I/O cell 231A are programmed to turn off. I/O cell 232A on FPGA circuit 121A is programmed as an input from port 125B to internal cell 242. Internal cell 242 is programmed to connect the signal to I/O cell 233A which is programmed as an output to port 125C. The corresponding I/O cells and internal cells of FPGA circuits 121B through 121M are similarly programmed in parallel with FPGA circuit 121A, thus effecting the disconnection of the other parallel bits of port 125J to 125A, and the connection of the other parallel bits of port 125B to 125C.

In one embodiment, some ports of crossbar network 120 are unidirectional, such as ports 125A and 125B of FIGS. 1 and 2. Port 125A, when connected, is always an output port relative to crossbar network 120. Port 125B, when connected, is always an input port relative to crossbar network 120. Other ports, such as port 125Q of FIG. 1, are bi-directional; at some times port 125Q is programmed to be connected as an output port, and at other times it is programmed to be connected as an input port.

In one embodiment, two bits of each port are implemented on each FPGA circuit 121A through 121 M; in this embodiment, half as many FPGA circuits are needed, half as many input and output ports are available, and it may take longer to program a switch connection or disconnection, since more internal and I/O cells must be programmed in order to effect a switch. Generally, the more cells which must be programmed, the longer programming takes.

The local busses, e.g., local bus 268, need not be programmed to extend to the entire width of the chip. In one embodiment using the AT6002 FPGA chip, the local busses are comprised of local bus segments which span eight (8) cells, and are then connected through a programmable repeater cell. The repeater cells can be programmed to route a signal to or from an express bus which can bypass certain sections of local bus and can thus facilitate faster signal propagation across the chip. In one embodiment, for example, each lower "East-West" local bus section is programmed to connect into any of the adjacent 8 cells (each of which cells has a left and a right "North-South" local bus associated with it), and then to connect to any of the 16 "North-South" local busses associated with those eight cells. The programmable repeater-cell feature also allows routing of the signals in a zigzag manner if there is congestion in one area of the chip due, for example, to signals coming in or out from both sides of the chip on a single row or column.

In one embodiment, the crossbar switch is incrementally reconfigurable, a process in which ports not involved in the reconfiguration are not affected by the reconfiguration programming operation.

In one embodiment, the I/O cells of each output port are programmed to latch the data being passed out of that port with a clock signal provided to the FPGA circuits, with each bit of a particular port being latched with a common clock signal.

Figure 3A:
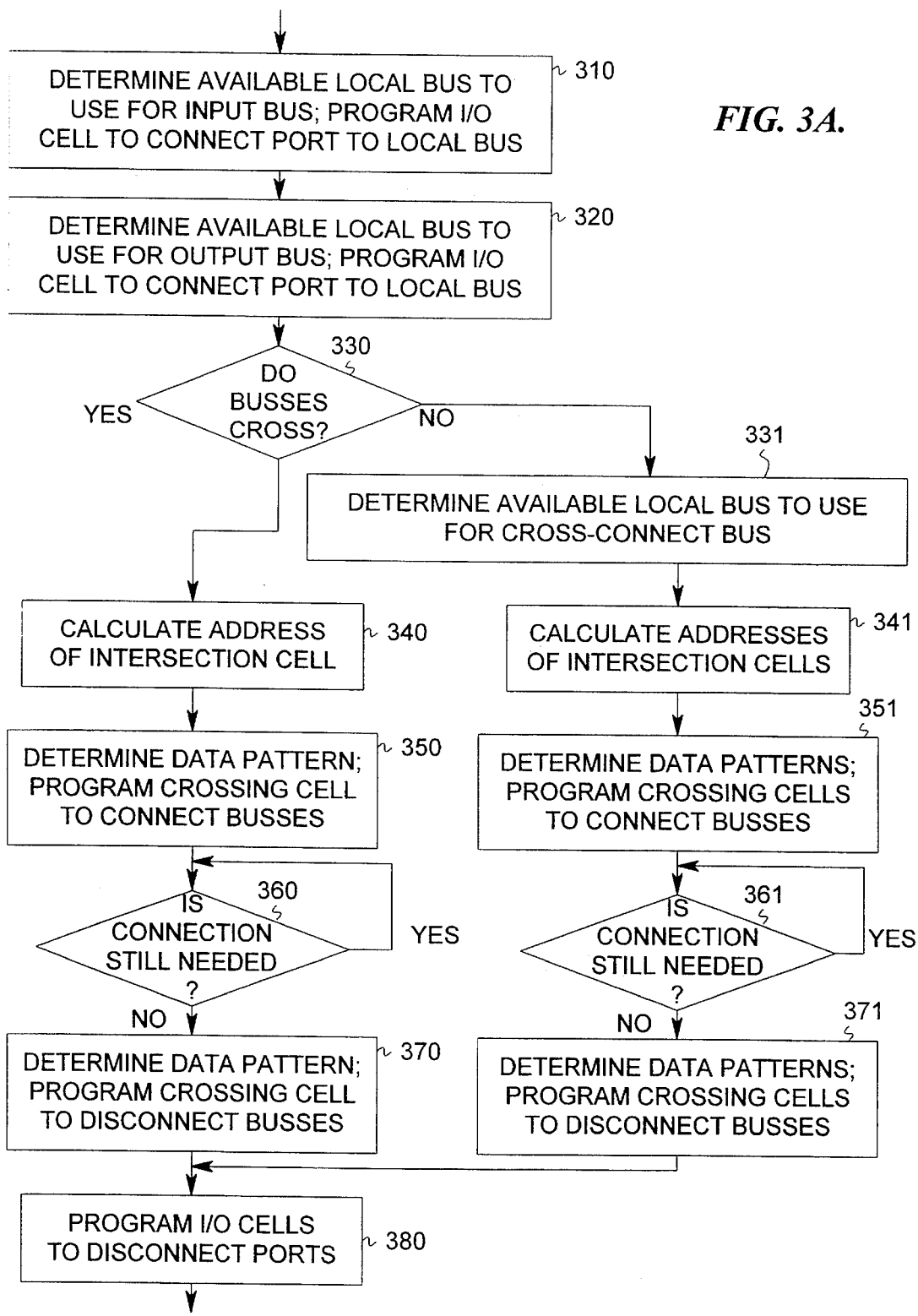
FIG. 3A is a first flow chart showing the operation of one embodiment of controlling a set of FPGA circuits as a crossbar network.

FIG. 3A is a flow chart illustrating an embodiment of a method used to control crossbar network 120. Block 310 represents the step of determining an available local bus in the FPGA circuit 121 A to use for the input local bus, and programming the appropriate I/O cell to connect the port to the input local bus. Control then passes to block 320. Block 320 represents the step of determining an available local bus in the FPGA circuit 121A to use for the output local bus, and programming the appropriate I/O cell to connect the port to the output local bus. Control then passes to block 330.

Figure 3B:
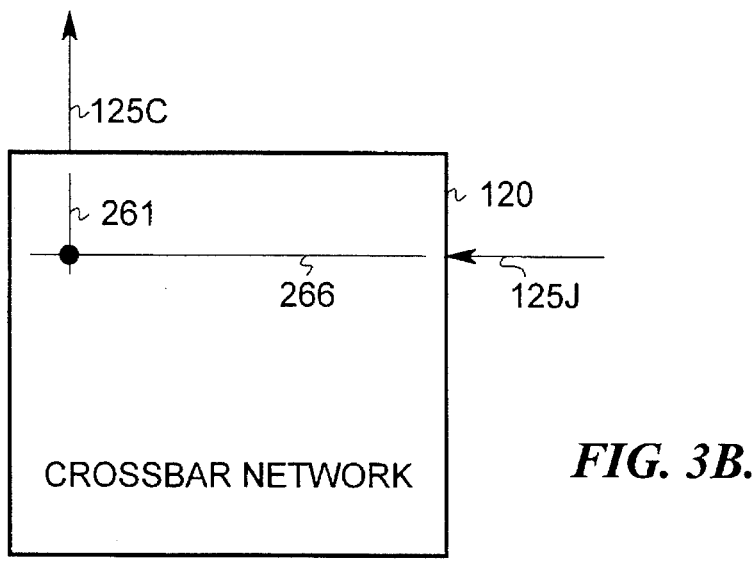
FIG. 3B is a schematic diagram illustrating a crossbar connection between ports which are connected to FPGA local busses which intersect.

Block 330 represents a test of whether the input local bus crosses the output local bus; if the local busses cross as schematically shown in FIG. 3B, control is passed to block 340; if they do not, control is passed to block 331. Block 340 represents the step of calculating the address of the cell at the intersection of the two crossing local busses. Control then passes to block 350. Block 350 represents the step of determining a data pattern which programs the cell that is located at the intersection of the crossing local busses to connect or transmit the data from the input local bus to the output local bus, and programming that cell with the appropriate connection data pattern. Control then passes to block 360. Block 360 represents the step of waiting or looping until the connection just made is no longer needed. Control then passes to block 370. Block 370 represents the step of determining a data pattern which programs that cell to disconnect the input local bus from the output local bus, and programming that cell with the appropriate disconnection data pattern. Control then passes to block 380. Block 380 represents the step of disconnecting the input port from the input local bus, and disconnecting the output port from the output local bus.

Figure 3C:
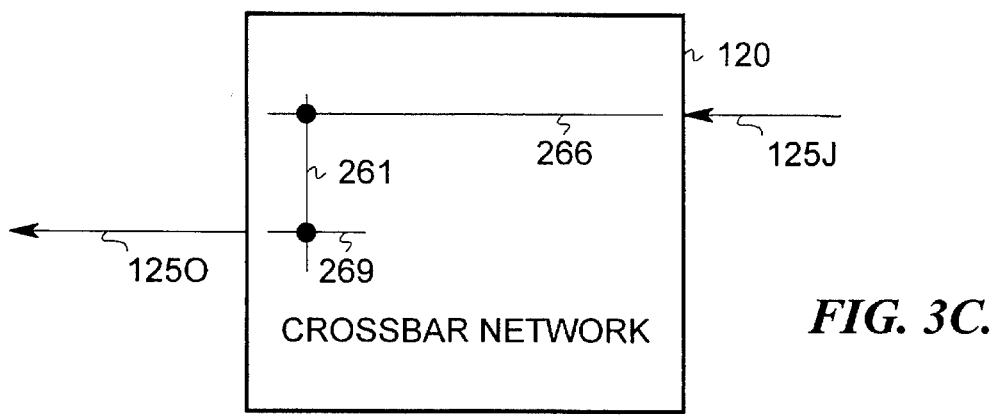
FIG. 3C is a schematic diagram illustrating a crossbar connection between ports which are connected to FPGA local busses which do not intersect.
Figure 3D:
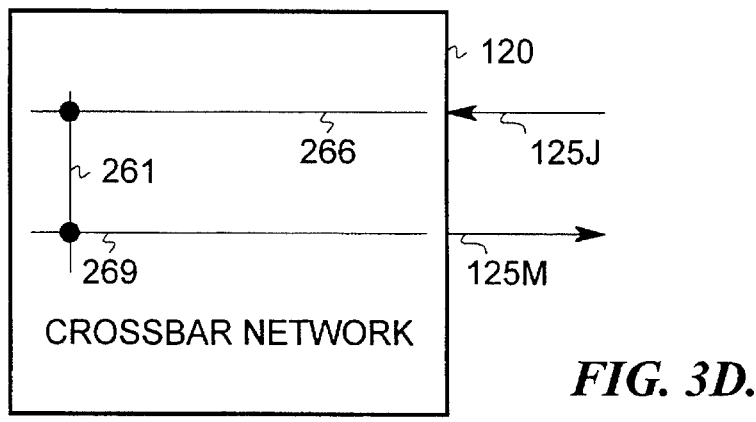
FIG. 3D is a schematic diagram illustrating another crossbar connection between ports which are connected to FPGA local busses which do not intersect.

Block 331, entered from block 330 when the input local bus does not cross the output local bus, represents the step of determining an available local bus in the FPGA circuit 12 1A to use for cross-connecting the input local bus to the output local bus, as schematically shown in FIG. 3C and FIG. 3D. Control then passes to block 341. Block 341 represents the step of calculating the address of the cells at the intersection of the input local bus and the cross-connecting local bus, and at the intersection of the cross-connecting local bus and the output local bus. Control then passes to block 351. Block 351 represents the step of determining data patterns which program each of the two cells that are located at the intersections of the crossing local busses to connect or transmit the data from the input local bus to the output local bus, and programming those cells with the appropriate connection data pattern. Control then passes to block 361. Block 361 represents the step of looping or waiting until the connections just made are no longer needed. Control then passes to block 371. Block 371 represents the step of determining data patterns which program those cells to disconnect the input local bus from the output local bus, and programming those cells with the appropriate disconnection data. Control then passes to block 380. As noted above, block 380 represents the step of disconnecting the input port from the input local bus, and disconnecting the output port from the output local bus.

In one embodiment, the I/O cells on one edge of the chip are each mapped to a local bus which is designated as their own "primary local bus". An input and output cell that each connect to a common physical pin on the part will share the same primary local bus. These primary local busses are selected such that they will not interfere with the primary local busses mapped for I/O pins on the opposite side of the part; this simplifies the routing of the part. The remaining local busses are considered non-primary local busses and are available for routing between the primary local busses mapped to I/O pins.

Figure 5:
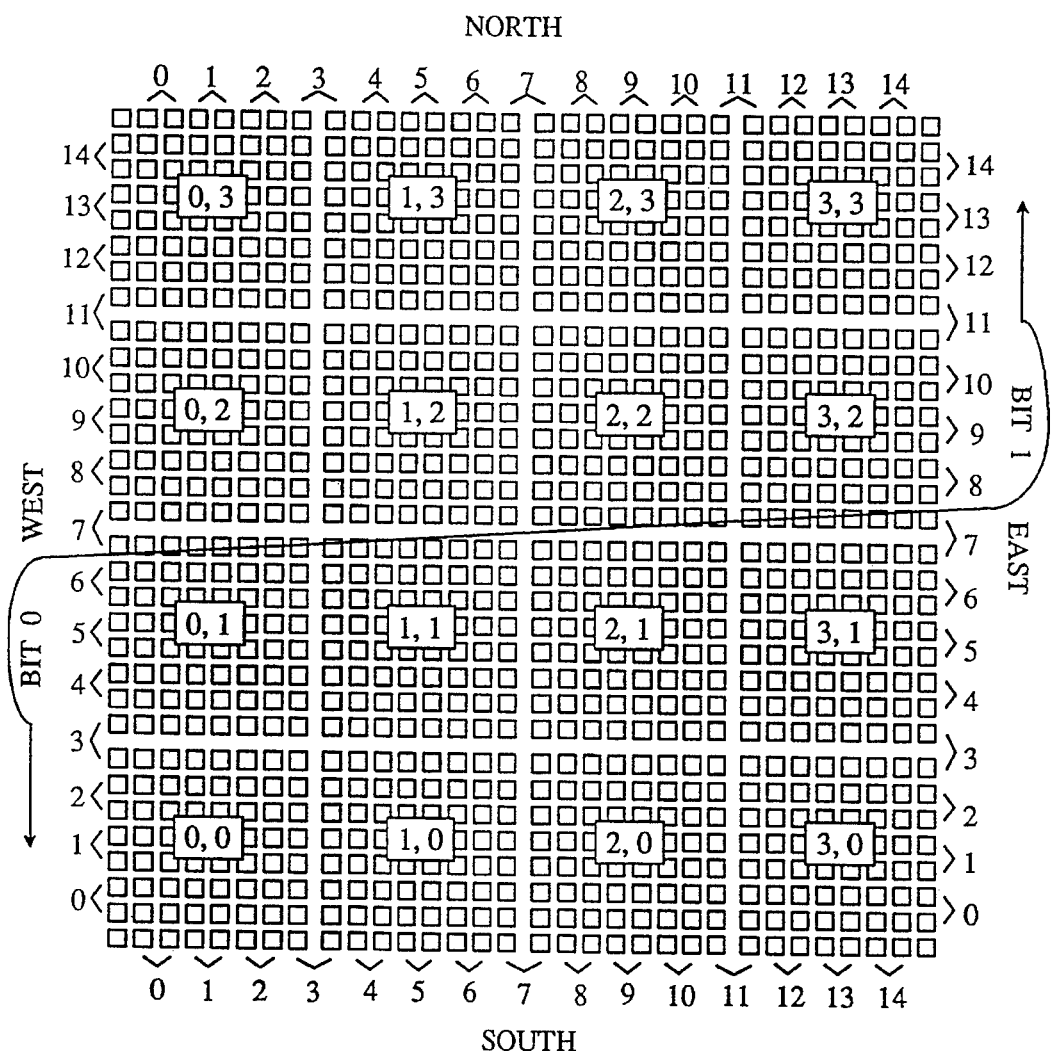
FIG. 5 is a generalized diagram of an FPGA circuit used to accommodate two bits per chip.

The layout of one chip using this embodiment, which uses 15 I/O cells per edge of an Atmel AT6002 chip and configures each part to contain two bits of an N-bit-wide 30-port crossbar switch, is schematically shown in FIG. 5. Each edge of the chip is referenced with a direction (North, South, East, and West), where approximately the North one-half of the chip is used for one of the two bits, and the South one-half is used for the other bit. The chip is divided into sixteen zones that represent the sections of the chip with common local busses. In this embodiment, a path is routed for each half of the chip from input to output, and the routing of these paths is symmetrical for each half. Each of the input ports can connect to any one or more of the output ports; thus a single input port can simultaneously drive several output ports. Alternatively, another embodiment uses the logic-function capability of internal cells to logically combine the data from more than one input port in any of numerous ways which may be specified (e.g., the data can be ANDed, ORed, XORed, or added), and then places the result on a single output bus. Alternatively, this embodiment can specify several inputs to be logically combined in different ways, with the various results being placed on several different output ports.

Figure 3E:
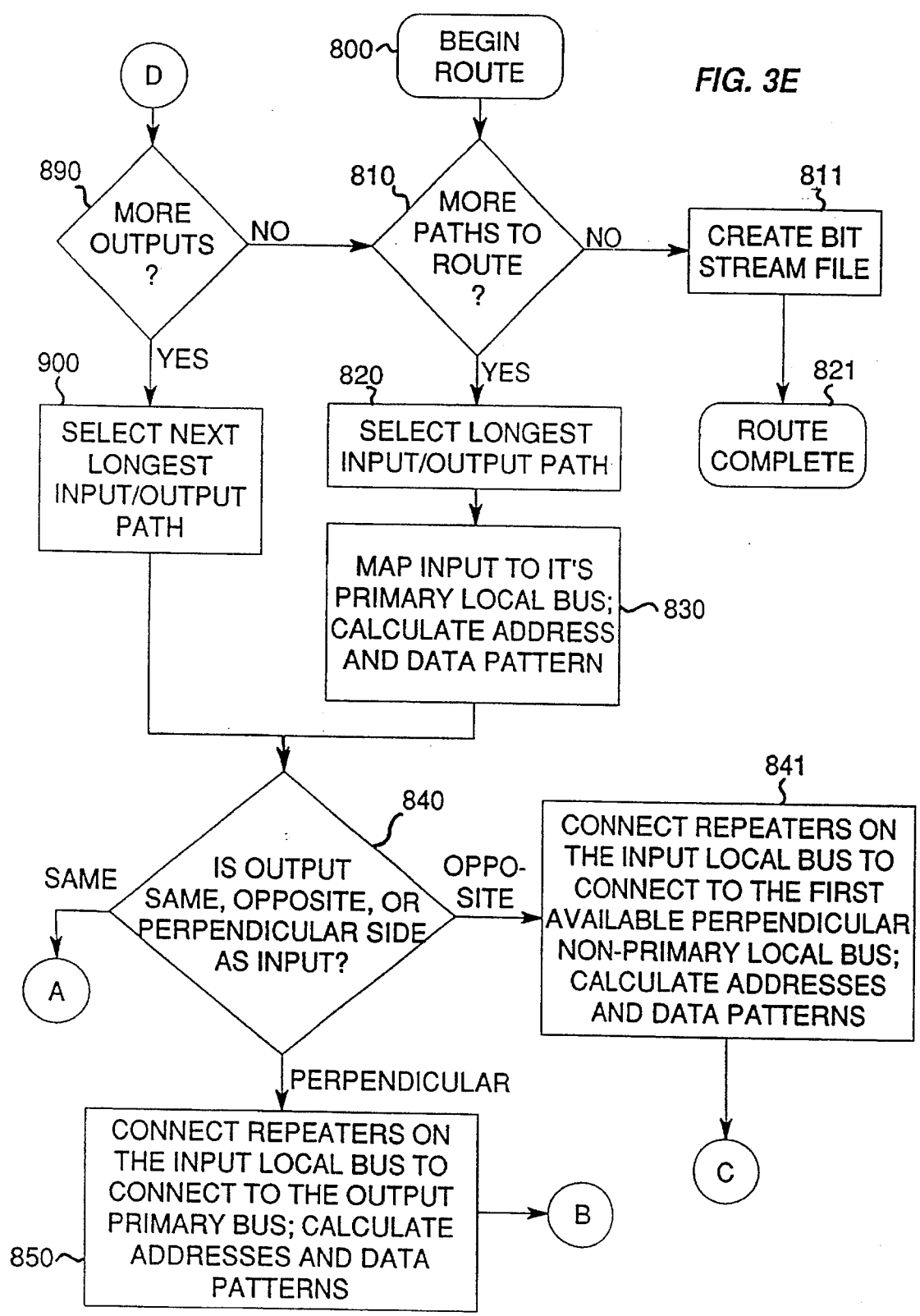
FIGS. 3E & 3F comprise a second flow chart showing the operation of another embodiment for controlling a set of FPGA circuits as a crossbar network.
Figure 3F:
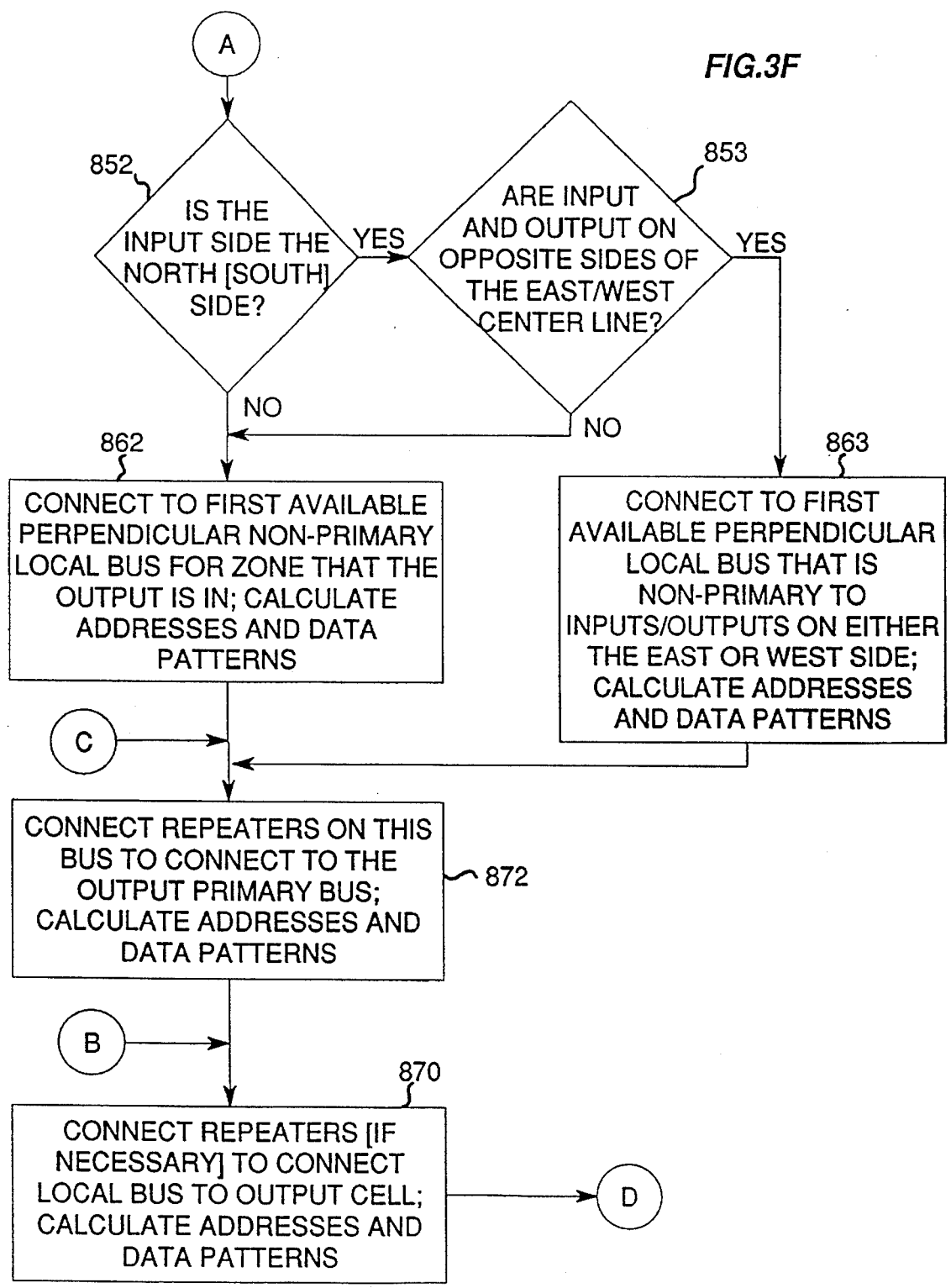

FIGS. 3E and 3F comprise a flowchart illustrating a method which can be used to control this embodiment of crossbar network 120. Like-lettered circles on FIG. 3E and 3F connect to one another. Block 800 represents the starting point of the flowchart, and passes control to block 810. Block 810 represents a test of whether any more input/output paths need to be routed; if there are more paths to be routed, control is passed to block 820; if there are no more paths, control is passed to block 811. Block 820 represents the step of selecting the longest input-to-output path; this path is routed first, and control is passed to block 830. Block 830 represents the step of choosing the primary local bus for the input pin and calculating the memory address of the corresponding I/O cell and determining the data pattern needed to program the I/O cell to connect the input pin to the input primary local bus. Control then passes to block 840. Block 840 represents a test of where the output pin is located, relative to the input pin; if the output pin is on a side perpendicular to the input pin, as schematically shown in FIG. 3B, then control is passed to block 850; if the output pin is on the opposite side from the input pin, as schematically shown in FIG. 3C, then control is passed to block 841; if the output pin is on the stone side as the input pin, as schematically shown in FIG. 3D, then control is passed to Block 852 on FIG. 3F.

Block 850, entered from block 840 when the output pin is on the side perpendicular to the input pin, represents the step of (a) calculating the memory addresses of the repeater cells and the internal cell needed to interconnect the two busses, (b) determining the data patterns for these locations, in order to program the connecting repeaters to extend the input primary local bus to reach the output primary local bus, and (c) connecting the two busses via the internal cell. Control then passes to Block 870 on FIG. 3F. Block 870 represents the step of (a) calculating the memory addresses of the repeater cells and the output I/O cell, (b) determining the data patterns for these locations, in order to program the connecting repeaters to extend the output primary local bus to reach from the interconnection internal cell to the output I/O cell, and (c) connecting the output primary local bus though the output I/O cell to the output pin. Control then passes to block 890 on FIG. 3E. Block 890 represents a test of whether the input pin has any more output pins which are to be connected to it; if so, then control is passed to block 900; if not, then control is passed back to block 810 and the flow chart continues as described previously for block 810. Block 900 represents the step of selecting the next longest input-to-output path which is to be connected to this input pin.

Block 841, entered from block 840 when the output is on the side opposite to the input, represents the step of (a) selecting the first available perpendicular local bus that it is not a primary local bus for any input or output, (b) calculating the memory addresses of the repeater cells and the connection internal cell which connects the perpendicular local bus to the input primary local bus, and (c) determining the data patterns for these locations in order to program the selected path. Control then passes to block 872 on FIG. 3F. Block 872 represents the step of (a) calculating the memory addresses of the repeater cells and the connection cell for the two busses, (b) determining the data patterns for these locations in order to further program the selected path (which involves connecting repeater cells to extend the perpendicular local bus to reach to the output primary local bus, and (c) connecting the perpendicular local bus to the output primary local bus). Control then passes to Block 870. Block 870 represents the step of (a) calculating the memory addresses of the repeater cells and the output I/O cell (b) determining the data patterns for these locations, in order to program the connecting repeater cells to extend the output primary local bus to reach the output cell, and (c) connecting the output primary local bus through the output I/O cell to the output pin. Control then passes to block 890 on FIG. 3E, which proceeds as described above.

Block 852, entered from block 842 when the output is on the same side and the input, represents a test of whether the input is on the Noah side for Bit 1 or South side for Bit 0; if it is, control is passed to block 853; if it is not, control is passed to block 862. Block 862 represents the step of (a) selecting the first available perpendicular local bus that it is not a primary local bus for an input or output for the zone that the output is in, (b) connecting to the bus, (c) calculating the memory addresses of the repeaters and the connection cell for the two busses, and (d) determining the data patterns for these locations. Block 872 represents the step of (a) connecting repeaters to extend the perpendicular local bus to reach the output primary local bus, (b) connecting to the bus, (c) calculating the memory addresses of the repeaters and the connection cell for the two busses, and (d) determining the data patterns for these locations. Block 870 represents the step of (a) connecting repeaters to extend the output primary local bus to reach the output cell, (b) connecting the bus to the cell, (c) calculating the memory addresses of the repeaters and the output cell, and (d) determining the data pattern for these locations. Block 890 represents a test of whether the input has any more outputs to be connected to it; if so, control is passed to block 900; if not, control is passed back to block 810 and the flow chart continues as previously described for block 810. Block 900 represents the step of selecting the next longest output to be connected to the input.

Block 853, entered from block 852 when the input is on the North or South side, represents a test of whether the input and output are on opposite sides of the vertical centerline between the East and West sides; if they are on opposite sides of the centerline, control is passed to block 863; if they are not on opposite sides, control is passed to block 862 and the flow chart continues as previously described for that block. Block 863 represents the step of (a) selecting the first available perpendicular local bus that it is not a primary local bus for an input or output on either the East or West sides, (b) connecting to the bus, (c) calculating the memory addresses of the repeaters and the connection cell for the two busses, and (d) determining the data patterns for these locations. Block 872 represents the step of (a) connecting repeaters to extend the perpendicular local bus to reach the output primary local bus, (b) connecting to the bus, (c) calculating the memory addresses of the repeaters and the connection cell for the two busses, and (d) determining the data patterns for these locations. Block 870 represents the step of (a) connecting repeaters to extend the output primary local bus to reach the output cell, (b) connecting the bus to the cell, (c) calculating the memory addresses of the repeaters and the output cell, and (d) determining the data patterns for these locations. Block 890 represents a test of whether the input has any more outputs to be connected to it; if so, control is passed to block 900; if not, control is passed back to block 810 and the flow chart continues as previously described for block 810. Block 900 represents the step of selecting the next longest output to be connected to the input.

Block 811, entered from block 810 if there are no more paths to route, represents the process of taking all the addresses and data previously determined and making a bit-stream file (or byte-stream file, depending on the requirements of the FPGA chosen for the design) for downloading into a part. Block 821 represents the end of the flowchart.

In one embodiment, system controller 110 maintains tables showing which local busses are in use and which are available, using known programming methods. In this embodiment, when system controller 110 selects to use a port, for example, as an input, it then determines the set of local busses which are to be used to route the signals from that port into the chip. It then examines the bus-availability table until it finds one local bus of the determined set which is available. In an embodiment using an FPGA such as the AT6002, each local bus is broken into local-bus segments, each of which may span, for example, 8 internal cells. For example, a port which is to be used as an input port from the "West" side of the chip generally has the upper East-West local bus and the lower East-West local bus to choose from. Suppose, in this example, the upper East-West local bus is already entirely "in-use" by signals going to a port on the "East" side of the chip (i.e., all of the segments for this local bus are marked "in-use"), and that some local-bus sections of the lower East-West local bus are in-use in the middle of the chip for some other purpose. System controller 110 connects the signal onto the western-most lower East-West local bus segment, through an appropriate internal cell to a North-South local bus, and then through another internal cell onto another East-West local bus which is found to be available to the selected exit point or crosspoint. System controller 110 then marks each segment of the local busses of the selected path as "in-use" in the bus-availability tables, and programs the FPGA to route the signals across the selected path of local busses and cells. When the crossbar connection is later to be disconnected, the connections are reprogrammed to disconnect from the local busses, and the bus-availability tables are updated to show the now freed local-bus segments as available once again.

In one embodiment, system controller 110 maintains tables showing which internal cells are in use and which are available, using known programming methods. Similar to the bus-availability tables described above, the cell-availability tables are used to select and mark internal cells as in-use as they become needed to connect local-bus segments, and later to mark the internal cells as available after the connection is removed.

In one embodiment using 15 I/O cells per edge of an Atmel AT6002 FPGA chip, the I/Os are represented by an array having an array index (using indexes 0 through 14), a data direction index (using indexes 0 through 1), and a chip-edge specification (i.e., the North, South, East, or West edge of the chip). In this embodiment, a formula which takes into account the array index, the data direction, and the chip edge is used to calculate the addresses of the SRAM control cells which control each I/O cell. Each of these addresses must be loaded with the appropriate data byte for the function specified. In this embodiment, the I/O cells to be programmed as input ports are programmed to function as "TTL level with pull-up" input cells, and the I/O cells to be programmed as output ports are programmed to function as "fast totem pole output with pull-up" output cells.

Figure 4:
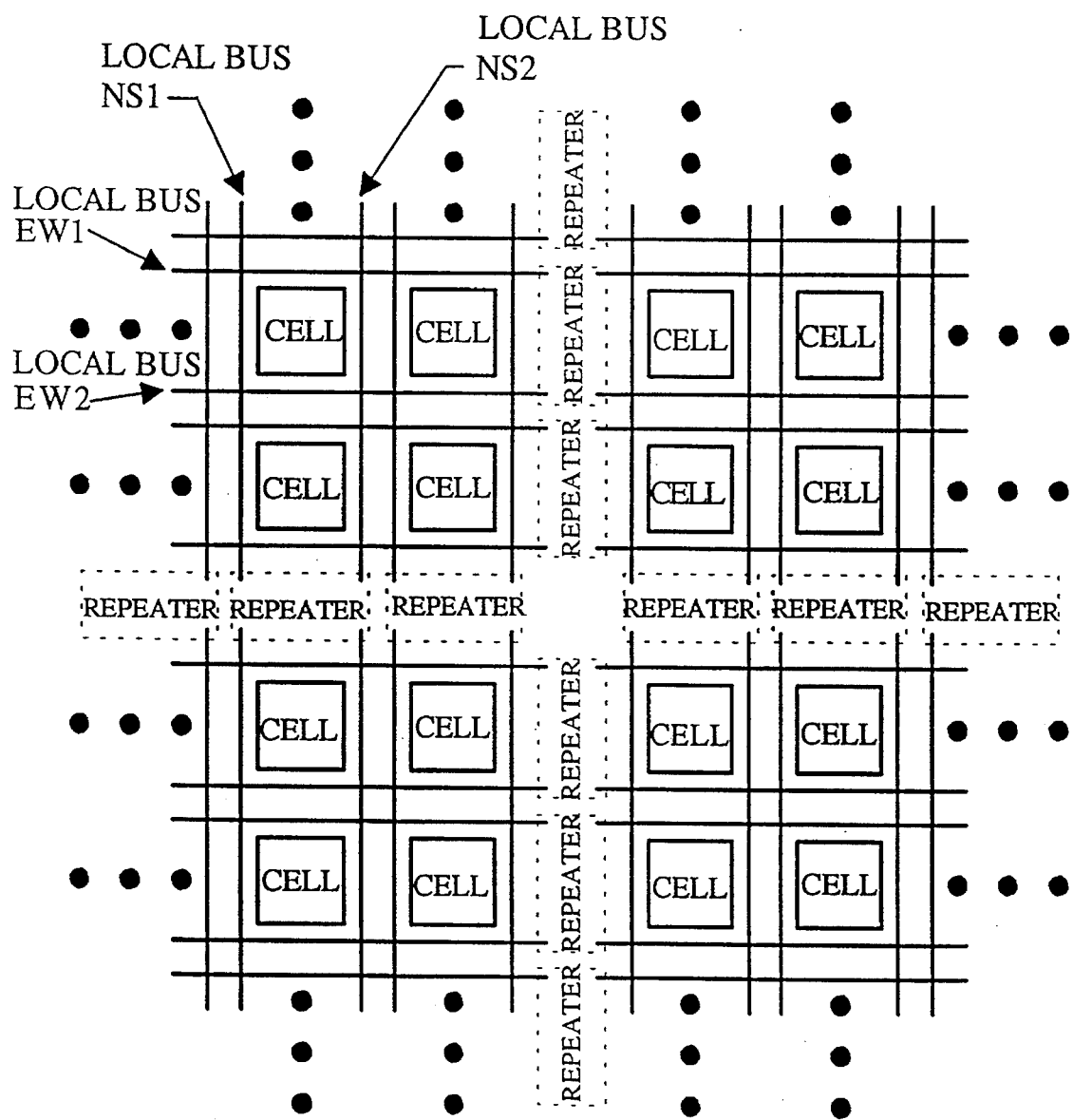
FIG. 4 is a schematic diagram illustrating details of the internal cell, repeater cell, and local bus structure of an FPGA circuit.

In this embodiment, each cell has two Noah-South and two East-West local bus segments associated with it (NS1, NS2, EW1 and EW2, respectively), as shown in FIG. 4. Each local bus segment is eight cells long, and can be connected to the next successive local bus through programmable repeater cells. The repeater cells divide the internal cell array into sixteen zones as shown in FIG. 5. FIG. 5 is a generalized diagram of an FPGA circuit used to accommodate two bits per chip. Each repeater cell contains unidirectional drivers for the local busses, but the repeater cells can be programmed to drive the local busses in either direction.

In this embodiment, each I/O cell has a primary local bus in order to enter into the internal cell array. Each of the repeater cells controls two local busses, and is programmed to control the connection and direction of each local bus. Thus, a North-South repeater cell can be programmed for no connection, Noah-to-South direction, or South-to-North direction on its NS1 local bus, and for no connection, Noah-to-South direction, or South-to-Noah direction on its NS2 local bus. Similarly, an East-West repeater cell can be programmed for no connection, East-to-West direction, or West-to-East direction on its EW1 local bus, and for no connection, East-to-West direction, or West-to-East direction on its EW2 local bus.

In this embodiment, the internal cells are used primarily for connecting I/O cells to local busses, and for connecting East-West local busses to North-South local busses. The internal cells on the edge (i.e., internal cells adjacent to the I/O cells) have a different data pattern from the other internal cells in order to connect to the I/O cells. In one embodiment, for example, internal cells on the array edge adjacent to the output I/O cells are programmed to latch the data flowing through them in a D-type flip-flop, in order to provide a synchronous or clocked output. Each of the output flip-flops has a clock input and a reset input. These inputs are programmed to tie to the global clock and reset which are connected to dedicated input pins on the AT6002 FPGA chip.

Figure 6:
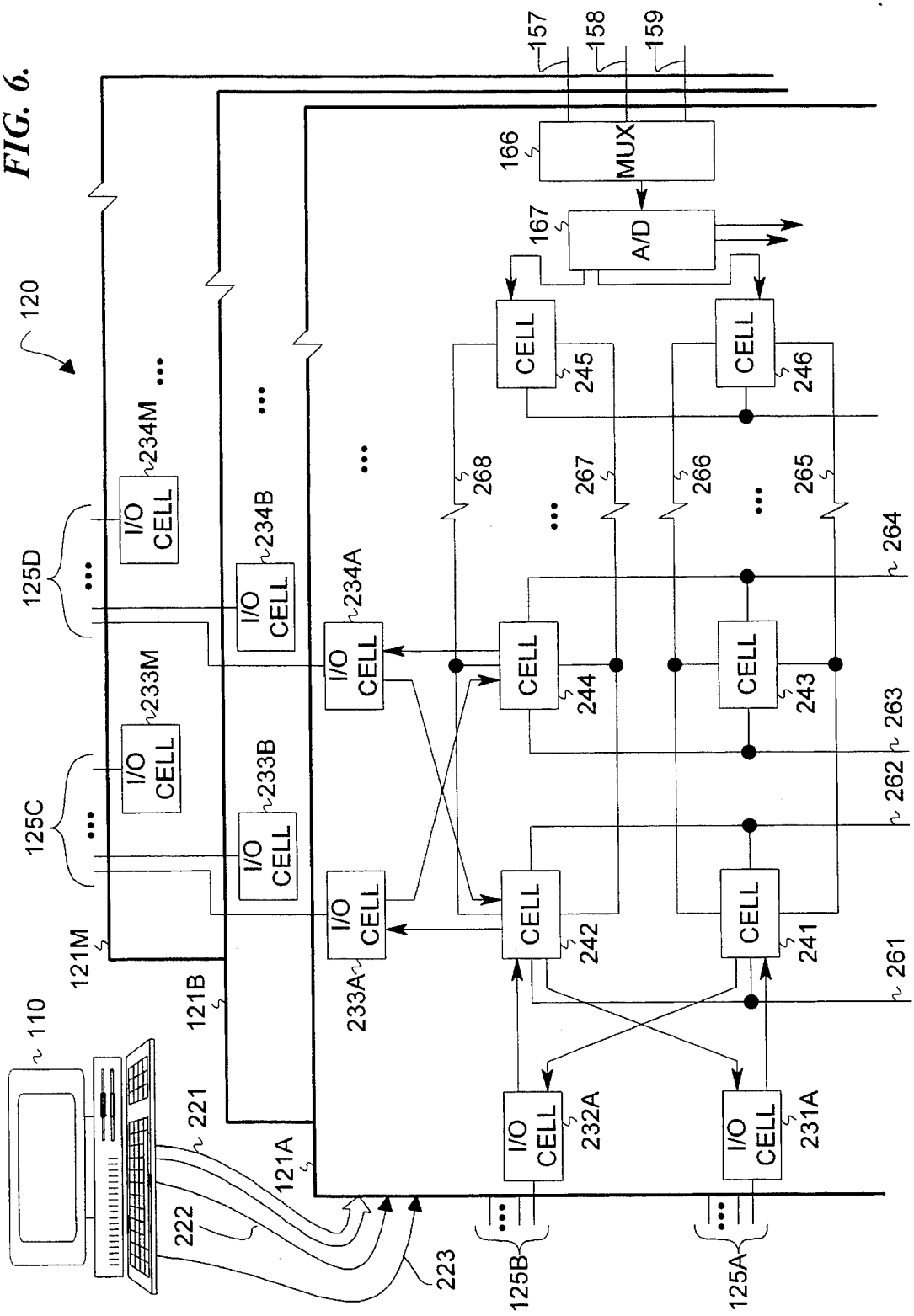
FIG. 6 is a schematic diagram illustrating portions of a set of field-programmable gate-array circuits used as crossbar-switch network 120 of FIG. 1, showing an embodiment which includes both analog and digital ports to the crosspoint network.

FIG. 6 is a schematic diagram illustrating portions of a set of field-programmable gate-array circuits used as crossbar-switch network 120 of FIG. 1 in an embodiment which includes both analog and digital ports to the crosspoint network. Video mux 166 is similar in function to video mux 161 of FIG. 1. The control function for the video analog mux (which passes on control lines 117 to video analog mux 161 in FIG. 1) enters chips 121A through 121M on control/address/data bus 221 under the control of configure signal 222 and clock 223. A/D converter 167 is similar in function to A/D converter 162 of FIG. 1. Analog image signals 157, 158, and 159 feed video mux 166. System controller 110 controls video mux 166 via control/address/data bus 221, under the control of configure signal 222 and clock 223, to select one of the analog image signals 157–159 which feed into video analog mux 166. The bits comprising the digital representation of the selected image signal are generated by A/D converter 167 and fed into the array of internal cells 241–246. The internal cells 241–246 are programmed to perform the crossbar-switch function as described above for FIG. 2.

One advantage of using a reprogrammable FPGA in the method and system described above is that the FPGA circuit itself is generally extensively tested by the manufacturer, and a large portion of the testing of the crossbar network system can be accomplished by software simulation of the network as driven by the microcode which controls the network and makes and breaks the crossbar connections.

In one embodiment, arithmetic or logical operations are performed on the signals as the signals pass through the crossbar connections programmed on the chip. For example, referring to FIG. 1, an image from a first point in time is stored in image buffer 141 (e.g., as a series of bytes, each representing a digitized pixel from a video image). Another image from a second point in time is stored in image buffer 143. Then, the series of bytes representing the image signal from image buffer 141 is fed into port 125B, while simultaneously the series of bytes representing the image signal from image buffer 143 is fed into port 125P. These signals are routed onto the appropriate local busses to an internal cell which, for example, exclusive-ORs (XORs) each respective byte of the two serial image bit streams (from ports 125B and 125P) and routes the resultant byte stream onto another local bus programmed to connect to port 125C and on to image processor 131. A person skilled in the art would readily recognize that an XOR or any other suitable logic function can be performed in crossbar network 120 on the signal or signals passing through it by routing the signals to the appropriate series of internal cells and programming those cells to accomplish the desired logical function.

In one embodiment of the present invention, video mux 161 is implemented as an analog crossbar network using methods similar to those described above, but using an analog FPGA circuit in place of the digital FPGA circuit. In this embodiment, analog local busses and an array of programmable analog gate internal cells are used to implement an analog FPGA. Associated with each internal cell is, for example, one SRAM byte which specifies the local bus connections to be made and the cell analog function to be performed. Each SRAM control byte is programmable by system controller 110 via control bus 117. In this embodiment, each internal cell comprises analog transmission gates, each of which is controlled by a bit of the cell's associated SRAM control byte to connect or disconnect the cell from an adjoining local bus. In one embodiment, video mux 161, as just described, is combined with A/D circuit 162 and digital crossbar network 120, forming a single combined analog and digital programmable crossbar network integrated circuit.

Calculating FPGA Addresses and Data Patterns

The addresses for a particular cell in an FPGA needed to establish a connection are dependent on the part number and on the manufacturer of that part. The specific table look-up values for, or formula needed to calculate, addresses and data for a particular part can be determined using the application notes for the part or by contacting the manufacturer of the particular part to be used. As few as one address, with a single data pattern loaded to that address, is needed in order to establish or break a particular connection. On the other hand, other embodiments may require that several addresses be calculated, and several data patterns be loaded, in order to accomplish the same result.

It is to be understood that the above description is intended to be illustrative, and not restrictive. Many other embodiments will be apparent to those of skill in the art upon reviewing the above description. For instance, in one embodiment described above, a plurality of M field-programmable gate-array circuits are used to obtain an 8-bit-wide digital data path through the N-input by N-output crossbar switch using two bits per chip, but a person skilled in the art could use other analogous methods to the same effect; for instance, a 16-bit-wide data path where four bits of each port are implemented in each FPGA, thus obtaining a smaller N/2-input by N/2-output crossbar switch using the same number of FPGA circuits. The scope of the invention should, therefore, be determined with reference to the appended claims, along with the full scope of equivalents to which such claims are entitled.

What is claimed is:

1. A method for connecting components in an electronic vision system, said method comprising the steps of:
   providing a field-programmable gate-array (FPGA) circuit having a plurality of ports;
   providing a plurality of electronic vision subsystems;
   coupling each of said plurality of electronic vision subsystems to a respective FPGA port from among said plurality of FPGA ports; and
   programming said FPGA circuit to create a plurality of connections among said plurality of electronic vision subsystems so that:
   at least two of said plurality of connections exist simultaneously;
   a starting time of one of said connections is not substantially simultaneous with starting times of other said connections; and
   an ending time of said one of said connections is not substantially simultaneous with ending times of other said connections.

2. A method according to claim 1, wherein said one of said connections is a digital connection comprising digital circuitry.

3. A method according to claim 2, wherein said digital connection connects a plurality of parallel bits.

4. A method according to claim 2, wherein data passing through said digital connection are latched in flip-flops on said FPGA.

5. A method according to claim 2, wherein a digital logical function is performed on data passing through said digital connection.

6. A method according to claim 1, wherein said one of said connections is an analog connection comprising analog circuitry.

7. A method according to claim 1, wherein an input port accepts an analog signal, an output port drives a digital signal, and a connection between said input port and said output port comprises a circuit to convert an analog signal into a corresponding digital signal.

8. A method according to claim 1, wherein said electronic vision subsystems comprise an image input device, an image buffer, and an image processor.

9. A method according to claim 8, wherein said electronic vision subsystems comprise an image display device.

10. A method according to claim 1, wherein said FPGA is incrementally reconfigurable.

11. An electronic vision system comprising:
    a field-programmable gate-array (FPGA) circuit having a plurality of ports;
    a plurality of electronic vision subsystems, each of said plurality of electronic vision subsystems coupled to a respective FPGA port from among said plurality of FPGA ports; and
    a system controller coupled to said FPGA circuit for programming said FPGA circuit to create a plurality of connections among said plurality of electronic vision subsystems wherein:
    at least two of said plurality of connections exist simultaneously;
    a starting time of one of said connections is substantially not simultaneous with starting times of other said connections; and
    an ending time of said one connection is substantially not simultaneous with ending times of other said connections.

12. An electronic vision system according to claim 11, wherein said one of said connections is a digital connection comprising digital circuitry.

13. An electronic vision system according to claim 12, wherein said digital connection connects a plurality of parallel bits.

14. An electronic vision system according to claim 12, wherein data passing through said digital connection are latched in flip-flops on said FPGA.

15. An electronic vision system according to claim 12, wherein a digital logical function is performed on data passing through said digital connection.

16. An electronic vision system according to claim 11, wherein said one of said connections is an analog connection comprising analog circuitry.

17. An electronic vision system according to claim 11, wherein an input port accepts an analog signal, an output port drives a digital signal, and a connection between said input port and said output port comprises a circuit to convert an analog signal into a corresponding digital signal.

18. An electronic vision system according to claim 11, wherein said electronic vision subsystems comprise a image input device, an image buffer, and an image processor.

19. An electronic vision system according to claim 18, wherein said electronic vision subsystems comprise an image display device.

20. An electronic vision system according to claim 18, wherein said FPGA is incrementally reconfigurable.

21. A method for crossbar switching, said method comprising the steps of:
providing a field-programmable gate-array (FPGA) circuit having a plurality of ports; and
programming said FPGA circuit to create a plurality of connections among said plurality of ports such that:
at least two of said plurality of connections exist simultaneously;
a starting time of one of said simultaneously existing connections is substantially not simultaneous with starting times of other said connections; and
an ending time of said one connection is substantially not simultaneous with ending times of other said connections.

22. A method according to claim 21, wherein said one of said connections is a digital connection comprising digital circuitry.

23. A method according to claim 22, wherein said digital connection connects a plurality of parallel bits.

24. A method according to claim 23, wherein said crossbar switching is used to programmably connect components of an electronic vision system.

25. A method according to claim 24, wherein data passing through said digital connection are latched in flip-flops on said FPGA.

26. A crossbar switch comprising:
a field-programmable gate-array (FPGA) circuit having a plurality of ports; and
a system controller connected to said FPGA circuit for programming said FPGA circuit to create a plurality of connections among said plurality of ports such that:
at least two of said plurality of connections exist simultaneously;
a starting time of one of said simultaneously existing connections is substantially not simultaneous with starting times of other said connections; and
an ending time of said one connection is substantially not simultaneous with ending times of other said connections.

27. A crossbar switch according to claim 26, wherein said one of said connections is a digital connection comprising digital circuitry.

28. A crossbar switch according to claim 27, wherein said digital connection connects a plurality of parallel bits.

29. A crossbar switch according to claim 28, wherein said crossbar switching is used to programmably connect components of an electronic vision system.

30. A crossbar switch according to claim 29, wherein data passing through said digital connection are latched in flip-flops on said FPGA.

31. A crossbar switch comprising:
a field-programmable gate-array (FPGA) circuit having a plurality of ports which can be programmably connected to each other; and
a system controller connected to said FPGA circuit for programming said FPGA circuit to:
at a first point in time, connect a first port chosen from said plurality ports to a second port chosen from said plurality of ports;
at a second point in time subsequent to said first point in time, connect a third port chosen from said plurality of ports to a fourth port chosen from said plurality of ports;
at a third point in time subsequent to said second point in time, disconnect said first port from said second port; and
at a fourth point in time subsequent to said second point in time, disconnect said third port from said fourth port.

32. A crossbar switch according to claim 31, wherein said connection between said first port and said second ports is a digital connection comprising digital circuitry.

33. A crossbar switch according to claim 32, wherein said digital connection connects a plurality of parallel bits.

34. A crossbar switch according to claim 33, wherein said crossbar switch is used to programmably connect components in an electronic vision system.

35. A crossbar switch according to claim 32, wherein data passing through said digital connection are latched in flip-flops on said FPGA.

36. A crossbar switch according to claim 32, wherein a digital logical function is performed on data passing through said digital connection.

37. A crossbar switch according to claim 31, wherein said one of said connections is an analog connection comprising analog circuitry.

38. A crossbar switch according to claim 37, wherein said crossbar switch is used to programmably connect components in an electronic vision system.

39. A crossbar switch according to claim 31, wherein an input port accepts an analog signal, an output port drives a digital signal, and a connection between said input port and said output port comprises a circuit to convert an analog signal into a corresponding digital signal.

40. A crossbar switch according to claim 39, wherein said crossbar switch is used to programmably connect components in an electronic vision system.

41. A crossbar switch comprising:
a field-programmable gate-array (FPGA) circuit having a plurality of digital destination ports, and a plurality of digital source ports which can be programmably connected to said destination ports; and
a system controller connected to said FPGA circuit for programming said FPGA circuit to:
at a first point in time, connect a first port chosen from said plurality of source ports to a second port chosen from said plurality of destination ports;
at a second point in time subsequent to said first point in time, connect a third port chosen from said plurality of source ports to a fourth port chosen from said plurality of destination ports without disturbing said connection from said first port to said second port;
at a third point in time subsequent to said second point in time, disconnect said first port from said second port without disturbing said connection from said third port to said fourth port; and
at a fourth point in time subsequent to said third point in time, disconnect said third port from said fourth port.

42. A method for crossbar switching, said method comprising the steps of:
providing a field-programmable gate-array (FPGA) circuit having a plurality of digital source ports which can be programmably connected to a plurality of digital destination ports; and
at a first point in time, programming said FPGA circuit to connect a first port chosen from said plurality of source ports to a second port chosen from said plurality of destination ports;
at a second point in time subsequent to said first point in time, programming said FPGA circuit to connect a third port chosen from said plurality of source ports to a fourth port chosen from said plurality of destination ports without disturbing said connection from said first port to said second port;

at a third point in time subsequent to said second point in time, programming said FPGA circuit to disconnect said first port from said second port without disturbing said connection from said third port to said fourth port; and at a fourth point in time subsequent to said third point in time, programming said FPGA circuit to disconnect said third port from said fourth port.

43. A crossbar switch comprising:

a field-programmable gate-array circuit having a first port and a second port which can be programmably connected to each other;

means for calculating an address within said field-programmable gate-array circuit to be programmed in order to connect said first port to said second port;

means for determining a first data pattern to load at said address in order to connect said first port to said second port;

means for determining a second data pattern to load at said address in order to disconnect said first port from said second port;

means for connecting said first port to said second port by loading said first data pattern at said address in said field-programmable gate-array circuit; and means for subsequently disconnecting said first port from said second port by loading said second data pattern at said address in said field-programmable gate-array circuit.

44. A crossbar switch according to claim 43, wherein said connection between said first port and said second ports is a digital connection comprising digital circuitry.

45. A crossbar switch according to claim 44, wherein said digital connection connects a plurality of parallel bits.

46. A crossbar switch according to claim 45, wherein said crossbar switch is used to programmably connect components in an electronic vision system.

47. A crossbar switch according to claim 44, wherein a digital logical function is performed on data passing through said digital connection.

48. A crossbar switch according to claim 44, wherein data passing through said digital connection are latched in flip-flops on said FPGA.

49. A crossbar switch according to claim 43, wherein said one of said connections is an analog connection comprising analog circuitry.

50. A crossbar switch according to claim 49, wherein said crossbar switch is used to programmably connect components in an electronic vision system.

51. A crossbar switch according to claim 43, wherein an input port accepts an analog signal, an output port drives a digital signal, and a connection between said input port and said output port comprises a circuit to convert an analog signal into a corresponding digital signal.

52. A crossbar switch according to claim 51, wherein said crossbar switch is used to programmably connect components in an electronic vision system.

53. A method for crossbar switching, said method comprising the steps of:

providing a field-programmable gate-array (FPGA) circuit having a plurality of first ports and a plurality of second ports which can be programmably connected to each other calculating an address within said field-programmable gate-array circuit to be programmed in order to connect a first port to a second port;

determining a first data pattern to load at said address in order to connect said first port to said second port;

determining a second data pattern to load at said address in order to disconnect said first port from said second port;

connecting said first port to said second port by loading said first data pattern at said address in said FPGA circuit; and subsequently disconnecting said first port from said second port by loading said second data pattern at said address in said FPGA circuit.

54. A method according to claim 53, wherein said connection between said first port and said second ports is a digital connection comprising digital circuitry.

55. A method according to claim 54, wherein said digital connection connects a plurality of parallel bits.

56. A method according to claim 55, wherein said crossbar switching is used to programmably connect components in an electronic vision system.

57. A method according to claim 54, wherein data passing through said digital connection are latched in flip-flops on said FPGA.

58. A method according to claim 54, wherein a digital logical function is performed on data passing through said digital connection.

59. A method according to claim 53, wherein said one of said connections is an analog connection comprising analog circuitry.

60. A method according to claim 59, wherein said crossbar switching is used to programmably connect components in an electronic vision system.

61. A method according to claim 53, wherein an input port accepts an analog signal, an output port drives a digital signal, and a connection between said input port and said output port comprises a circuit to convert an analog signal into a corresponding digital signal.

62. A method according to claim 61, wherein said crossbar switching is used to programmably connect components in an electronic vision system.

63. A method according to claim 53, wherein said FPGA is incrementally reconfigurable.

* * * * *

UNITED STATES PATENT AND TRADEMARK OFFICE
CERTIFICATE OF CORRECTION

PATENT NO. : 5,530,813

DATED : June 25, 1996

INVENTOR(S) : Mark T. Paulsen et al.

It is certified that error appears in the above-identified patent and that said Letters Patent is hereby corrected as shown below:

Column 13, line 38, delete "Noah-South" and insert therefor --North-South--.

Signed and Sealed this

Twenty-fourth Day of December, 1996

Attest:

BRUCE LEHMAN

Attesting Officer    Commissioner of Patents and Trademarks